(12) United States Patent
Vandwalle et al.

(10) Patent No.: US 10,003,642 B2
(45) Date of Patent: Jun. 19, 2018

(54) OPERATING A CLUSTER OF PEER-TO-PEER DEVICES

(71) Applicant: Apple Inc., Cupertino, CA (US)

(72) Inventors: Pierre B. Vandwalle, San Francisco, CA (US); Christiaan A. Hartman, San Jose, CA (US); Yong Liu, Campbell, CA (US)

(73) Assignee: Apple Inc., Cupertino, CA (US)

( * ) Notice: Subject to any disclaimer, the term of this patent is extended or adjusted under 35 U.S.C. 154(b) by 116 days.

(21) Appl. No.: 14/293,407

(22) Filed: Jun. 2, 2014

(65) Prior Publication Data

US 2015/0006633 A1    Jan. 1, 2015

Related U.S. Application Data

(60) Provisional application No. 61/841,267, filed on Jun. 28, 2013, provisional application No. 61/985,711, filed on Apr. 29, 2014.

(51) Int. Cl.
| | |
|---|---|
| *H04L 29/08* | (2006.01) |
| *H04W 48/10* | (2009.01) |
| *H04W 48/18* | (2009.01) |

(52) U.S. Cl.
CPC ...... *H04L 67/1051* (2013.01); *H04L 67/1059* (2013.01); *H04L 67/1068* (2013.01); *H04W 48/10* (2013.01); *H04W 48/18* (2013.01)

(58) Field of Classification Search
CPC ... H04L 67/16; H04L 67/104; H04L 67/1051; H04W 48/10; H04W 48/18

(Continued)

(56) References Cited

U.S. PATENT DOCUMENTS 6,791,981 B1 * 9/2004 Novaes .................. H04L 12/18
                                                      370/390
7,675,869 B1 * 3/2010 Anker .................... H04L 12/42
                                                      370/255

(Continued)

FOREIGN PATENT DOCUMENTS

| WO | 2005036801 A2 | 4/2005 |
|---|---|---|
| WO | 0249289 | 6/2006 |

*Primary Examiner* — Ranodhi Serrao
*Assistant Examiner* — James Fiorillo
(74) *Attorney, Agent, or Firm* — Sterne, Kessler, Goldstein & Fox, PLLC

(57) ABSTRACT

A system, apparatus, and method are provided for operating a peer-to-peer communication environment. The environment includes one or more clusters of peer devices, wherein devices in a single cluster are organized into a logical hierarchy under an anchor master (at the root of the hierarchy) and any number of synchronization masters; other devices are non-master devices. Synchronization parameters established by the anchor master and disseminated throughout the hierarchy enable the clusters' devices to rendezvous, discover peers and services, and communicate among themselves. The anchor master may adjust the synchronization parameters to avoid conflict with another hierarchy. Each device issues beacons (e.g., heartbeats, discovery beacons) that identify the number of devices synchronized with the reporting device, which allows the anchor master to calculate the total number of cluster members. Devices may also report details of a neighboring cluster (e.g., its synchronization parameters) via a beacon or some other communication.

30 Claims, 5 Drawing Sheets

(58) Field of Classification Search
USPC ........ 709/204, 206, 224; 370/312, 338, 350, 370/390
See application file for complete search history.

(56) References Cited

U.S. PATENT DOCUMENTS

| | | | |
|---|---|---|---|
| 9,473,574 B2* | 10/2016 | Vandwalle | H04L 67/104 |
| 2002/0059434 A1* | 5/2002 | Karaoguz | H04L 12/5692 |
| | | | 709/228 |
| 2002/0065919 A1 | 5/2002 | Taylor et al. | |
| 2003/0117966 A1* | 6/2003 | Chen | H04L 45/02 |
| | | | 370/255 |
| 2008/0273540 A1* | 11/2008 | Gerovac | G06F 9/52 |
| | | | 370/396 |
| 2010/0131644 A1* | 5/2010 | Jeong | H04W 40/24 |
| | | | 709/224 |
| 2010/0162036 A1* | 6/2010 | Linden | G06F 11/181 |
| | | | 714/4.11 |
| 2010/0226342 A1* | 9/2010 | Colling | H04W 56/002 |
| | | | 370/336 |
| 2011/0093599 A1 | 4/2011 | Baratz et al. | |
| 2011/0249664 A1* | 10/2011 | Chou | H04J 3/1647 |
| | | | 370/345 |
| 2011/0255448 A1* | 10/2011 | Hartman | H04L 27/0006 |
| | | | 370/277 |
| 2012/0008527 A1* | 1/2012 | Le | H04W 48/08 |
| | | | 370/254 |
| 2012/0030683 A1* | 2/2012 | Kurdi | G06F 9/5072 |
| | | | 718/104 |
| 2012/0284434 A1 | 11/2012 | Warren et al. | |
| 2013/0013250 A1 | 5/2013 | Stacey et al. | |
| 2013/0132500 A1* | 5/2013 | Vandwalle | H04L 67/104 |
| | | | 709/208 |
| 2013/0132502 A1 | 5/2013 | Stacey et al. | |
| 2014/0293991 A1* | 10/2014 | Abraham | H04W 52/0225 |
| | | | 370/350 |
| 2014/0313966 A1* | 10/2014 | Shukla | H04W 48/10 |
| | | | 370/312 |
| 2014/0341073 A1* | 11/2014 | Abraham | H04W 48/18 |
| | | | 370/254 |
| 2015/0131571 A1* | 5/2015 | Fodor | H04W 4/005 |
| | | | 370/329 |
| 2015/0172391 A1* | 6/2015 | Kasslin | H04L 67/16 |
| | | | 370/338 |

* cited by examiner

| Communication 400 | Anchor Master Preference 402 | Anchor Master Address 404 | Cluster Size 406 | Hop Count 408 | Time Offset 410 |

OPERATING A CLUSTER OF PEER-TO-PEER DEVICES

RELATED APPLICATION

This application claims priority to U.S. Provisional Patent Application No. 61/841,267, filed Jun. 28, 2013, and U.S. Provisional Patent Application No. 61/985,711, filed Apr. 29, 2014, both of which are incorporated herein by reference.

BACKGROUND

A system, apparatus and methods are provided for operating a collection of devices within a peer-to-peer networking environment.

Peer-to-peer network protocols or technologies allow individual nodes or devices to communicate directly with other peers, and may be contrasted with infrastructure-based environments in which a required central node (e.g., a server, a router, a switch, an access point) passes communications between different nodes. One benefit of direct peer-to-peer communication is that it avoids unnecessary additional routing and processing of communications through other devices.

However, existing peer-to-peer network technologies have limitations that diminish their usability, scalability, and/or performance. For example, some technologies offer only limited peer-to-peer communication capabilities because they are focused on infrastructure-based solutions and therefore require a central node. Peer-to-peer communication in these environments requires negotiation with the central node, and may not be possible between devices that do not share a common central node. Also, communications between peers may be limited by the capabilities of the central node (e.g., frequency band, bandwidth, modulation).

Because of its prominent role, a central node may become congested and thus increase communication latency and decrease communication throughput within the environment. Further, a central node acts as a single point of failure. Even if another node can take over the functions of a failed or missing central node, until that occurs the network may be severely degraded.

Some other technologies that allow for peer-to-peer communications require significant power consumption by individual nodes, which is a principal concern for devices that rely on battery power (e.g., smart phones, tablets, laptop and notebook computers). Excessive power consumption by a peer might be caused by inefficient discovery of services and/or other devices, by having to act as a central node, by inefficient use of the device's transceiver, and/or for other reasons. For example, requiring a device to continually or regularly poll or query other devices will cause it to consume significant amounts of power, especially for a wireless device travelling through different spatial regions.

Yet further, some networking technologies or protocols that support peer-to-peer communications do not coexist well with other technologies. For example, in a wireless environment, typical peer-to-peer protocols are not flexible enough to share a device's radio, antenna or frequency spectrum with other protocols or between applications (e.g., to maintain a Bluetooth® connection). Some peer-to-peer technologies also do not permit multicast communications, instead requiring a device to contact multiple peers individually, and/or do not scale well as the environment becomes more densely populated.

Also, in true peer-to-peer network environments, it can be very difficult or even impossible to determine how many peers are cooperating within the environment at a given time. This information may be useful or even necessary, perhaps to ensure efficient exchange of communications between nodes or to support organization or management of the environment.

In addition, when one collection of peer-to-peer devices abuts the operating area of another collection, depending on their configurations there may be a possibility of interference in their operations. A true peer-to-peer network architecture should be able to recognize this situation, and should alleviate it if and when it does occur.

SUMMARY

In some embodiments, systems, apparatus, and methods are provided for managing a cluster of peer devices (e.g., portable computers, smart phones). In these embodiments, devices within a cluster synchronize among themselves to promote discovery of peer devices and available services, and to select one or more devices to serve as masters to facilitate the synchronization and management of the cluster.

Individual devices synchronize with a nearby master device, and lower-level masters synchronize with higher-level masters, with the entire cluster synchronized under one anchor master (i.e., the highest-level master). The masters promote synchronization by conducting regular rendezvous periods, termed "availability windows" or "discovery windows," during which some or all devices tune to a common (wireless) communication channel.

In some embodiments, each master reports to a higher-level master the number of devices synchronized to it, and the anchor master (and/or other devices within the cluster) can determine or estimate the total number of devices participating in the cluster. Illustratively, the size of a cluster may be a factor when a new device (e.g., a device that is turned on or that moves into a spatial region occupied by a cluster) determines which of multiple available clusters of devices it should join.

In some embodiments, different clusters of peer devices may be within communication range of each other, and their anchor masters may take action to avoid overlapping discovery windows. For example, if discovery windows of two or more clusters are found to overlap, the anchor master of one of them, identified deterministically, will adjust its cluster's discovery window schedule.

DETAILED DESCRIPTION

Figure 1:
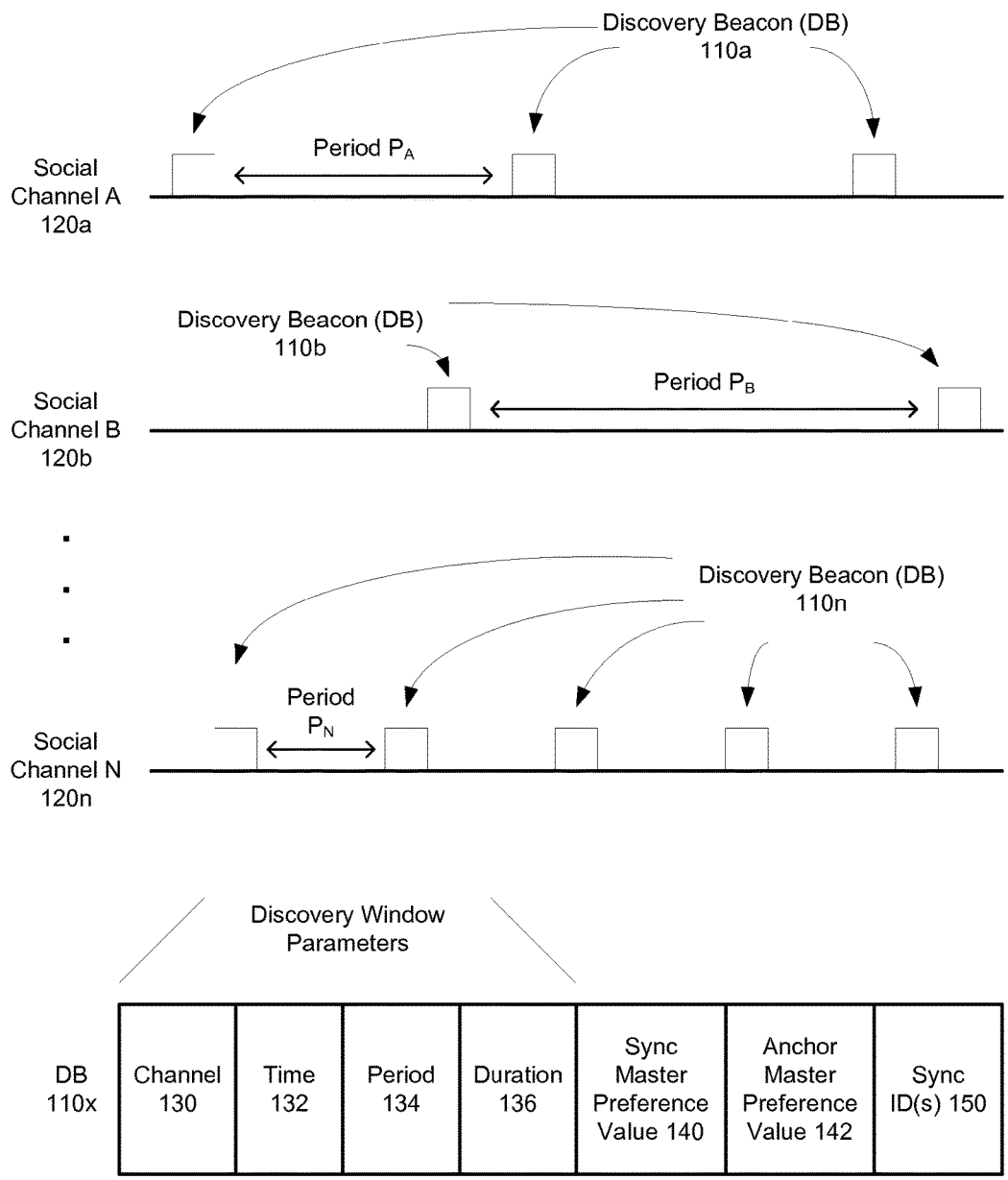
FIG. 1 depicts the use of discovery beacons for achieving and maintaining synchronization among cluster devices, according to some embodiments.

The following description is presented to enable any person skilled in the art to make and use what is described herein, and is provided in the context of particular applications and their requirements. Various modifications to the disclosed embodiments will be readily apparent to those skilled in the art, and the general principles defined herein may be applied to other embodiments and applications.

In some embodiments, a system, apparatus, and method are provided for managing one or more clusters of peer devices (e.g., mobile wireless devices). In these embodiments, devices within a single cluster synchronize themselves to promote discovery of peer devices and available services, at low cost to the participating devices in terms of power consumption. One or more devices are selected to serve as masters to facilitate the synchronization and cluster management. In particular, an anchor master is identified among the cluster's devices, and manages the overall synchronization by setting synchronization parameters, determining or estimating the size of the cluster (e.g., the number of devices participating in the cluster), avoiding interference with a neighboring cluster, and/or through other activity.

Introduction

A peer-to-peer wireless communication environment may be characterized by any number of devices of the same type and/or different types—such as smart phones, tablets, personal digital assistants, laptop and desktop computers, media devices (e.g. for streaming multi-media content), and so on. Different devices will have different features, may execute different applications, may have different power levels (e.g., battery charges), different communication needs, different loads (e.g., on a processor, on an antenna), may be heard by (or may hear) other devices with varying signal strengths, etc. In addition, the communication environment may be fluid, with devices continuously entering, moving through and exiting the spatial region encompassing the environment.

Some embodiments disclosed herein enable devices in such an environment to discover each other and to communicate directly, peer-to-peer. These embodiments: promote low power consumption even while making devices and services readily discoverable; coexist with other communication technologies (e.g., Bluetooth®); support multi-band operation (e.g., 2.4 GHz and 5 GHz); avoid the throughput and latency degradation usually encountered with network infrastructure (e.g., access points) while maintaining compatibility with infrastructure-based technologies; easily and quickly recover if and when a device acting as a master exits the environment; are scalable to accommodate dense environments having many devices; and avoid interference with other collections of devices. These and other features and advantages are described below.

In some embodiments, a collection of devices in an environment is synchronized so that they rendezvous at predetermined times on predetermined channels. A synchronized collection of devices may be termed a cluster; multiple clusters that share synchronization parameters may be termed a network. A period of time during which devices of a single cluster rendezvous is termed a discovery window, and all master devices within the cluster advertise the same schedule of discovery windows, which is illustratively defined by a channel (on which the devices congregate), a periodicity with which the windows occur, and a duration (e.g., a minimum duration) of the windows. During a discovery window, peers may exchange multicast and/or unicast data communications, facilitate management or operation of the cluster, and discover other devices and services.

Parameters of one or more upcoming discovery windows (e.g., channel, start time and duration) are communicated via discovery beacons that are broadcast on one or more social channels. In different implementations, different strategies for encountering a beacon may be applied. For example, a device may listen on a given social channel for a continuous period of time sufficient to hear at least one discovery beacon, may periodically listen for short periods of time, etc.

Thus, when a device boots or moves into an environment of peer devices, it will tune to a predetermined social channel and quickly learn where and when it may rendezvous with other devices. If the device does not hear a discovery beacon, it may assume that it should act as a master and begin issuing its own discovery beacons to facilitate synchronization with other devices that may be present or that may later appear.

Synchronization parameters (e.g., a schedule of upcoming discovery windows) may also be announced during a discovery window in some implementations, thereby saving the devices the expense of switching their radios to a social channel to receive the parameters. A device may even power off its radio when not listening for a discovery beacon, participating in a discovery window, communicating directly with a peer or using it for some other purpose.

A device participating in a cluster may therefore share a radio, antenna and/or other communication resource(s) among multiple device functions, such as an infrastructure connection or a Bluetooth® link. However, the communication requirements of the synchronized peer-to-peer environment—such as periodically tuning to a social channel to receive a discovery beacon, and attending discovery windows on rendezvous channels—may conflict with other demands for those resources.

Within a community of peer devices, a selection procedure is applied to determine which devices will become masters and assume responsibility for synchronizing other devices. The number of master devices selected may depend on the number of peer devices present, their signal strengths, signal propagation patterns, operating parameters, etc.

Although devices in the communication environment engage in peer-to-peer communications without the burden of infrastructure requirements, the selection of masters will logically organize the cluster's devices into a hierarchy for purposes of synchronization. Within the hierarchy, an "anchor master" (or top master) is responsible for overall synchronization of the cluster via synchronization parameters conveyed by the discovery beacons it broadcasts. Each subordinate master, called a synchronization (or "sync") master, synchronizes with the anchor master or an intervening sync master, and retransmits or repackages the anchor master's synchronization parameters within its own discovery beacons, thereby extending the range of the overall synchronization. Other devices participating in the hierarchy become non-master devices.

The radio range of a single wireless device (e.g., the anchor master) is limited, which would normally prevent that device from organizing devices beyond a local region. Requiring subordinate masters to rebroadcast its synchronization parameters allows that single wireless device to synchronize a collection of devices spread over a larger area.

The entire cluster enjoys the resulting benefits (e.g., ready discovery of services and other devices, less power consumption).

Unlike an environment that has infrastructure requirements (e.g., requiring coordination via an access point), because a master's principal task is simply to disseminate rendezvous parameters, loss of a master device is easily rectified. For example, the rendezvous schedule published by a missing anchor master device will simply be maintained by the cluster's synchronization masters while a replacement anchor master is chosen, thereby keeping all devices synchronized. And, that replacement will generally maintain the same schedule.

Different algorithms for selecting masters may be applied at different times and/or in different environments, but generally serve to promote any or all of these objectives: even spatial distribution of masters throughout the environment, a tunable density of masters within the environment and control of the size of the geographic area comprising the environment.

In some embodiments, an algorithm for selecting or identifying masters is executed regularly to ensure the most appropriate devices act as masters, based on various metrics or attributes of the devices. The selection process may also consider how many masters are already present in an area, how many masters a given peer device can hear, how far away they are (e.g., based on signal strength or some other measure of distance), etc.

Some entities addressed in the following description may be known by different terms in other contexts, and therefore the following mapping is provided to identify some alternative terminology, which is not intended to be exhaustive. For example, a generic master device may be called a "synchronization station." The device acting as anchor master may also be known as a "root synchronization station," a "root," a "root master" or a "top master." A synchronization master other than the anchor master may also be known as a "branch synchronization station," a "branch" master or a subordinate master. A non-master device may also be termed a "leaf" device or a "slave." A discovery beacon may alternatively be titled a "Periodic Synchronization Frame" (or PSF), and a discovery window may be called an "availability window." A cluster of devices may alternatively be called a tree, a synchronization tree or a hierarchy. Other terms introduced below include a "synchronization beacon" that may also be known as a "Master Indication Frame" (or MIF).

Sections that follow discuss synchronization of devices within a peer-to-peer communication environment to form a cluster, management of a cluster (especially when another cluster is nearby), and an illustrative peer device, according to some embodiments.

Synchronization of Devices

As discussed above, synchronization of devices within a wireless communication environment according to some embodiments allows them to easily discover each other, identify available services and engage in direct peer-to-peer communications (unicast and/or multicast), all while conserving power resources and coexisting with other communication processes.

Synchronization to form a cluster commences as soon as a device comes online or moves within range of at least one other device operating a compatible protocol, and can be maintained as long as the device is online within the spatial area encompassing the synchronized devices (e.g., as long as it is in range of a master device).

Through the synchronization and master selection processes, devices are automatically organized into a hierarchical cluster, in which masters at each level (or stratum) of the hierarchy periodically broadcast synchronization parameters in order to achieve and maintain synchronization among devices in an area. Discovery Beacons (DBs) are one mechanism for disseminating synchronization parameters, and are consumed by all synchronized devices.

Discovery beacons serve to convey information such as, but not limited to, information for synchronizing devices' clocks, a description of one or more upcoming discovery windows during which cluster devices can rendezvous, and metrics or attributes of the anchor master and the synchronization master that transmitted the DB. In other embodiments, a DB may include a different collection of information, but will normally include criteria identifying at least one discovery window.

Formation of a cluster and synchronization of devices within it may be affected by configuration or operating parameters such as, but not limited to: a maximum depth or stratum, periodicity of discovery beacons, number of master devices (e.g., overall and/or within range of a given device), the selection algorithm used to select masters, device metrics or attributes considered by the selection algorithm, etc. In different embodiments, different parameters may be applied. U.S. patent application Ser. No. 13/657,707, entitled "Selection of Synchronization Stations in a Peer-to-Peer Network Environment" and filed Oct. 22, 2012 discloses methods of selecting masters in a peer-to-peer network and is incorporated herein by reference.

FIG. 1 depicts the use of discovery beacons for achieving and maintaining synchronization among cluster devices, according to some embodiments.

In these embodiments, discovery beacons 110 (e.g., beacons 110a, 110b, 110n) are transmitted on regular bases on one or more social channels 120 (e.g., channel A 120a, channel B 120b, channel N 120n).

Different master devices may transmit discovery beacons on the same or different social channels, and any given master may use one or more social channels (and/or other channels) to convey its DBs. Different masters in a single cluster may use different social channels, perhaps to avoid interference with each other, because the social channel used by one master may be in use by a different master for a different purpose (e.g., an infrastructure connection), and/or for some other reason. Discovery windows may or may not be conducted on social channels.

Although multiple social channels 120 are depicted in FIG. 1, in some implementations all master devices in one cluster may use the same social channel and advertise the same schedule of discovery windows. Social channels and/or other channels discussed herein may be IEEE 802.11 wireless channels.

On social channels 120a, 120b, 120n, respective discovery beacons 110a, 110b, 110n are broadcast on periodic bases by a responsible master. Each of the DBs broadcast by a single master on a single channel (e.g., beacons 110a) may be identical or may differ somewhat.

Although the period of discovery beacons of each channel ($P_A$, $P_B$, $P_N$) is different in FIG. 1, in some embodiments in which multiple social channels are employed, the beaconing periods of two or more channels may be identical. An illustrative period between DBs on one channel may be on the order of 100 milliseconds. Different masters may use the same or different DB periods. In some implementations, the length or duration of a discovery beacon period may be inversely proportional to the overall number of masters broadcasting DBs (or the number of masters in a particular region that are broadcasting).

It may be noted that time periods denoted herein as milliseconds (ms) may alternatively be implemented in terms of time units (TU) of the same or equivalent magnitude. As specified in the IEEE 802.11 standard, a time unit is equal to 1,024 microseconds. Thus, a 100 ms time period referred to herein may instead be implemented as 100 time units or as an equivalent number of time units (e.g., approximately 98 TU), 102.4 ms may be implemented as 100 TU, etc.

In some embodiments, DB periods will be different on each social channel; however, the discovery window periods implemented by the masters issuing the DBs may be the same. Therefore, within one cluster, multiple DB periods and a single discovery window period may be implemented.

When transmitting a DB, the issuing master merely needs to tune its radio to the correct channel and power it on long enough to send the beacon. It need not remain on that channel after issuing the DB, but rather can turn off its radio to conserve power, switch it to a different social channel (e.g., to prepare to transmit a DB on a different channel) or use it for some other purpose, such as attending a discovery window (as described below), handling infrastructure communication, exchanging data with another device, etc.

In some embodiments, discovery beacons need not adhere to strict periodic scheduling. Instead, beacons may be sent as regularly as possible but defer to other device operations as warranted. In some implementations, discovery beacons need only to be issued frequently enough to yield at least a minimal average periodicity that enables new peer devices to discover a cluster of devices with some probability or within some limited length of time.

DB 110x of FIG. 1 is an illustrative beacon broadcast by a master in some embodiments. In other embodiments, a discovery beacon may contain a subset or a superset of the illustrated elements. For example, although DBs are primarily described herein as being issued by masters, non-master devices may also issue discovery beacons or other types of beacons or frames, but these non-master beacons or frames may include only a subset of the information elements carried by DB 110x, and may be issued with longer periods.

In the illustrated embodiment, information elements such as channel 130, time 132, and period 134 (and optionally duration 136) may be collectively referred to as "synchronization parameters" or "discovery window parameters" because they allow a listening device to learn of a sequence of discovery windows that has been imposed by the master that issued the DB (or by a superior master). Channel 130 identifies the channel (e.g., an 802.11 wireless channel) on which all discovery windows (or at least the next discovery window) will occur, time 132 identifies when the window(s) will occur, and period 134 identifies the discovery window period, which will allow the listening device to calculate successive discovery window starting times. Duration 136 identifies the duration of the discovery window.

Multiple sets of synchronization parameters may be included in a DB, either to advertise sequences of discovery windows on different channels, to advise other devices of a change from one sequence to another, or for some other reason.

Time element 132 of the synchronization parameters of illustrative discovery beacon 110x may identify an absolute starting time (e.g., based on a synchronized clock, UTC (Coordinated Universal Time) or some other common reference) and/or a relative time. In some implementations, the timestamp field carries the TSF (Timing Synchronization Function) of the device that issued DB 110x.

In some embodiments, time 132 includes multiple values that a peer device uses to compute the starting time of the next discovery window. For example, time 132 may include a "target" timestamp configured to indicate when DB 110x was formed and queued for transmission within the issuing master (e.g., when the DB was placed into a transmit buffer), and an "actual" timestamp configured to indicate when the DB was actually dispatched via the master's antenna.

Illustratively, the DB may be considered formed as of the time a "master offset" parameter is calculated by the master. The master offset value, also included within DB 110x as part of time 132 or a different information element, represents the issuing master's internal offset to the start of the next discovery window, measured from the time it releases the DB. Thus, the master offset measures the period of time from the target timestamp to the start of the discovery window, as calculated by the station that issued the discovery beacon.

With these values, a peer device that consumes DB 110x can compute an offset to the starting time of the discovery window as follows:

Offset=Master offset−(actual timestamp−target timestamp)

In particular, the peer device receives the master offset and, from the target and actual timestamps, can measure how much of that master offset time period has elapsed; it then subtracts that elapsed period from the master offset to determine the amount of time remaining until the discovery window.

Period 134 identifies the period of discovery windows conducted by the issuing master. The entire cluster of peer devices may apply the same period and the same schedule of discovery windows, illustratively set by the cluster's anchor master.

Duration 136 of DB 110x is optional in some implementations, but when provided indicates the minimum amount of time, during the discovery window, that the device that issued DB 110x will be listening and available for communication. The duration may also apply to the synchronized devices that consume beacon 110x; that is, a device that attends the window may be required to be available for at least that period of time, measured from the commencement of the window.

In some embodiments, a master may automatically extend its discovery window (e.g., in increments matching duration 136 or by some other time duration) as long as at least one station is communicating with it during that window. Thus, even if multiple stations wish to communicate with the master device during the limited duration of a discovery window, because the window will be extended, they may be able to do so without waiting for another discovery window.

Similarly, a peer device that attends the discovery window may extend its window as long as at least one of its peers engages it in communication. Therefore, one peer that wishes to communicate with another peer may simply issue a first set of packets, datagrams, messages, or other units of communication to that other peer during a discovery window. Both peers will then automatically extend their windows because of the active communication. Advantageously, this allows extensive peer-to-peer communication during discovery window extensions without saturating or monopolizing bandwidth during the discovery window.

Thus, a maximum duration of a master's presence during a discovery window may be specified in DB 110x and/or may be announced during the discovery window. Illustratively, the master may need to depart the window in order to issue a DB on a different channel, to use its radio for another communication function, or for some other reason. As for individual devices, they may depart a discovery window if they have nothing to communicate and if no other device communicates with it during some period of time within the window.

In other embodiments, the discovery window parameters of a discovery beacon may explicitly identify one or more discovery windows instead of identifying just one and supplying a period. These embodiments may be implemented in environments in which a master device and/or other peer devices cannot commit to a regular, periodic schedule of discovery windows. In yet other embodiments, a periodic schedule may be applied, but one or more discovery windows may be explicitly added to the schedule, or one or more occurrences of a periodic window may be cancelled.

Thus, synchronization parameters or data of a DB may identify any number of discovery windows (e.g., one or more). Different DBs transmitted on the same or different social channels, and by different masters, may identify the same or different discovery windows. Typically, however, synchronization parameters set by the anchor master (including the schedule or sequence of discovery windows) are applied throughout the cluster. Thus, in these embodiments, all discovery beacons broadcast throughout the cluster report the same schedule of discovery windows.

In some embodiments, discovery windows are numbered and conducted as a repeating sequence. For example, the n discovery windows conducted in one sequence may be numbered 0 through n−1. After one iteration, the discovery window sequence numbers repeat (i.e., from 0 through n−1). The sequence number of the next discovery window occurring after DB 110*x* may be explicitly identified in the beacon (e.g., in an information element not depicted in FIG. 1), may be determined during the discovery window, or may be learned in some other way.

Illustrative discovery beacon 110*x* of FIG. 1 also reports one or more preference values (alternatively termed a master rank, a master preference value, or a selection value). A master preference value or master rank is a value (e.g., an integer) used to identify the suitability or preference of a device to be a master.

A device's master preference value is calculated using various metrics, attributes or characteristics of the corresponding device, and possibly characteristics of the communication environment or the device's cluster. Illustrative metrics for calculating a device's master preference value include available power resources (e.g., battery strength or charge, connection to an AC power source), processor load, signal strength, the device's name and/or address (e.g., MAC address, other address), name or address of the device's anchor master, a timestamp, the device's level or stratum within the cluster (e.g., number of hops from the anchor master), the periodicity (or average periodicity) of the device's discovery beacons, a social channel used by the station, other device obligations (e.g., Bluetooth coexistence, infrastructure connection), a randomly generated numerical value, and so on.

Instead of or in addition to conveying a master's rank or master preference value, a discovery beacon may include the information or attributes (e.g., master indication attributes) that are used to calculate a master's rank or master preference value.

Master preference values of synchronized devices may be compared as part of a selection process to determine which devices should be masters within one cluster. The process may be executed on a regular basis, such as during or after every sequence of discovery windows or on a fixed schedule.

In DB 110*x*, sync master preference value 140 is the master preference value of the synchronization master that broadcast beacon 110*x*, and indicates that device's suitability or preference to be a master within its cluster. By advertising its master preference value, all devices in range of that master can correctly apply the selection process and, for example, determine whether they are better suited to be a master.

Similarly, anchor master preference value 142 is the master preference value of the anchor master for the cluster in which beacon 110*x* was broadcast, and indicates that device's suitability or preference to be a master. As will be seen below, by propagating anchor master preference value 142 throughout the cluster, a device at the fringe of the cluster or in an area overlapping multiple separate clusters can determine which cluster to join. In addition, all devices in one cluster can determine whether they are better suited to be the anchor master.

When DB 110*x* is issued by the anchor master of a cluster, master preference values 140, 142 will match. Alternatively, one of the master preference value fields could be omitted.

In some implementations, a discovery beacon may include information elements other than those depicted in DB 110*x* of FIG. 1. For example, a beacon may identify an algorithm for selecting masters, specify constraints on masters (e.g., how many can be within range of each other), advertise a maximum depth for the device's cluster, provide a notification that a device is departing the cluster, etc. Thus, various cluster attributes identified above and below, which reflect operation or structure of a cluster, and/or attributes of one or more specific (master) devices, may be conveyed within a discovery beacon and/or other beacon frames.

Although a master may have a stated period to the issuance of discovery beacons, as already mentioned that period is flexible and there may be high tolerance for variation. A given DB may be advanced or delayed in time because of other demands on the master device's radio, because of contention on the communication channel or for some other reason. In some implementations, DB transmission times may vary on the order of +/−20 milliseconds every 100 milliseconds.

Discovery beacons may be transmitted opportunistically, meaning that if a master's radio is tuned to a different channel at the time it would ordinarily issue a DB on a social channel, it may instead issue the beacon on its current channel. Discovery beacon broadcasts will return to their normal schedule on the social channel(s) when the master is able.

This type of situation, in which a DB is sent on a non-social channel to identify a future discovery window, can be useful to a localized cluster of devices. Such devices likely will be associated with the same infrastructure network on the same (non-social) channel. Transmitting a DB on this channel saves these devices the cost of a channel switch (i.e., to the social channel) and avoids interfering with their infrastructure communications.

In the worst case, a new device tuned to a master's normal social channel may miss a limited number of discovery beacons if the master is busy on a different channel. However, the master may be tuned to a commonly used frequency (e.g., an infrastructure channel required for a particular application, as described above), and may therefore reach the same device at a different time.

Among other information that may be included in a DB is the issuing master's (average) period for sending discovery beacons, and the channel or channels the beacons will be broadcast on. This allows a peer device to determine the amount of time it may need to listen on a particular social channel in order to hear a DB and learn the discovery window schedule.

Discovery windows scheduled by a master may or may not occur at a regular period, and may or may not be synchronized with the master's DBs. In other words, the discovery windows may, but need not, occur at identical offsets from the discovery beacons. An illustrative duration of a full sequence of discovery windows may be on the order of multiple seconds, although a specific implementation of an embodiment may employ a shorter or longer duration.

In some embodiments, there is less tolerance regarding an discovery window period than there is regarding a discovery beacon period, perhaps on the order of +/−100 microseconds per second for discovery windows (compared to +/−200 milliseconds per second for DBs). Whereas DBs are very short (e.g., less than 1 millisecond) but issued frequently, discovery windows are relatively long and conducted infrequently. For example, discovery windows may last 16 ms, 50 ms, or longer. Discovery beacons may be scheduled opportunistically because of their short duration, but discovery windows are configured for device discovery and communication, and therefore generally may not be conducted spontaneously or opportunistically.

Although relatively infrequent, discovery windows may monopolize a radio interface for a significant period of time; because of this, adherence to a strict schedule is advantageous, especially if other radio technologies are present (e.g., Bluetooth). Also, other (synchronized) devices are depending upon the advertised schedule of windows for discovery and/or peer communication, which leaves less room for variation.

Therefore, in some embodiments, a discovery beacon period will have a relatively high tolerance for variation, while a discovery window period has a relatively low tolerance for variation. One advantage of this strategy is that it allows for Wi-Fi contention that occurs at every discovery beacon transmission. Transmission of a discovery beacon is only possible when the selected social channel is not in use, and contention for the channel or the radio may or may not delay issuance of the DB. Therefore, strict scheduling of all DB transmissions would be difficult to achieve.

When a peer device first synchronizes with a master device and begins attending discovery windows, in the first window (and/or the first window that all devices are required to attend) it may issue a message identifying itself, identifying its master preference value, providing its selection metrics, advertising its services, requesting identification of services offered by peer devices, etc. Any devices wishing to communicate with it can then make contact.

Although discovery windows are provided as a primary mechanism for peer devices to discover each other and services that are offered, a device (including a master in some implementations) may skip one or more windows in a sequence. For example, if a peer device needs to use its radio for some other purpose at regular intervals that occasionally overlap with a discovery window, it may choose to not attend a conflicting discovery window at all, may arrive late, or may leave early. The device may or may not advise a master or other devices of its absence (e.g., via a multicast message).

In some embodiments, a device may set a "presence mode" for itself, and advertise this value to its master (i.e., the master with which it has synchronized) and/or other peers, to indicate how frequently it will tune to or attend advertised discovery windows. In some implementations, a presence mode (or PM) is an integer value, usually a power of 2 such as 1, 2, 4, and so on. The reciprocal of the device's PM is a fraction indicating how many discovery windows in a sequence it will attend. For example, if a device's PM is equal to 1, the device will attend every discovery window; with a PM of 2, the device will attend every window having a sequence number that is zero or a multiple of 2 (i.e., ½ of the windows); if its PM is equal to 4, it will attend every window whose sequence number is zero or a multiple of 4 (i.e., ¼ of the windows).

Higher presence mode values allow a device to skip more windows and turn off its radio, thereby saving power but potentially sacrificing synchronization with its peers. Ultimately, a presence mode equal to the number of discovery windows in a sequence means that a device will attend only one discovery window per sequence. A PM value of zero may indicate that a device is always available (i.e., not just during discovery windows).

In some embodiments, every synchronized device must attend at least one discovery window in the sequence advertised by its master. For example, devices may be required to attend discovery window 0 of each sequence. Thus, in this case, a PM value equal to the length of the discovery window sequence indicates that the device will be present only during discovery windows having sequence number 0.

The length of a discovery window sequence is generally a power of 2 (e.g., 8, 32, 256). In some implementations, sequence numbers of discovery windows conducted by a master begin at zero, and increase one at a time until reaching the value length-1 (e.g., 7, 31, 255), after which they repeat. Synchronization masters are required to adopt and repeat (in their beacons) the current sequence number of its master (i.e., a higher-level synchronization master or the anchor master). Therefore, all devices synchronized under one anchor master (i.e., all peer devices within one cluster) will agree on which discovery window has sequence number 0.

In some embodiments, sequences of discovery windows advertised by different masters may be of different lengths. However, all sequences will be aligned so that all devices having a particular presence mode value will attend the same windows. In other words, all devices will agree on which particular windows are multiples of a given number.

For example, consider a cluster in which discovery window sequences of lengths 8, 16, and 64 are in use among different sets of devices (e.g., devices synchronized with different masters). Among the devices implementing the sequence of eight windows, every eighth window will be known as discovery window sequence number 0. Every discovery window having sequence number 0 for those devices will be a discovery window having sequence number 0 or 8 for those devices having a sequence that is 16 windows long, and as a discovery window having sequence number 0, 8, 16, 24, 32, 40, 48 or 56 for those devices with 64 discovery windows in their sequences.

A device may attend more discovery windows than its PM indicates, but by announcing its presence mode value (e.g., via a multicast message in discovery window sequence number 0), other devices will know when they can interact with it. And, as described previously, as long as one peer device sends a communication to a device during a window attended by the receiving device, that device will extend its presence on that channel in order to conduct the communication, if possible, and will be able to be contacted by yet other peers as well.

Further, in some embodiments, whenever a peer device having a presence mode greater than one (or some other threshold) receives a communication, it may automatically set its presence mode to one (or some other lower value) in order to facilitate the desired communication. Yet further, a device with a low presence mode (e.g., zero or one), after receiving a multicast frame in one discovery window, may repeat it in one or more subsequent windows to help get it to its peers.

A master may have any PM value; although it sends discovery beacons at periodic intervals (possibly even during a discovery window), it may shut off its radio or use its radio or antenna for other communication requirements during a discovery window when it is not beaconing.

In some embodiments, two or more peer devices wishing to conduct a relatively extended period of communication (e.g., for file transfer, to engage in a game or other application) may establish their own synchronization for the purpose of exchanging data, parallel to the overall synchronization, but outside of or in addition to scheduled discovery windows. In these embodiments, one of the two or more devices may assume the role of a non-selection master, meaning that it does not participate in a formal master selection process, but is available for other devices to synchronize to or with (e.g., to conduct a file transfer, to play a game). Devices synchronized with a non-selection master may form an independent basic service set (IBSS).

A non-selection master may issue beacons that the other peer devices with which it will communicate will use to synchronize with the non-selection master, but which other devices in the cluster will ignore. Illustratively, these beacons may be transmitted during a discovery window and/or on an agreed-upon channel. A non-selection master's beacons may specify that the device is a non-selection master, so that devices not needing to directly communicate with it will know that they should not synchronize with it. When a device that has been engaged in communication with a non-selection master terminates that communication, it may re-synchronize with a regular master and rejoin that master's cluster (e.g., if synchronization with the non-selection master caused it to lose synchronization with the cluster).

A device that wants to synchronize or maintain synchronization with a cluster of peers may be unable to do so, perhaps because it cannot monitor the cluster's social channel(s), has other commitments during the scheduled discovery windows, or for some other reason. In this situation, the device may become a non-selection master (and identify when it is available) to help other devices discover it. Alternatively, it may request alteration to the cluster's discovery window schedule to accommodate the device, or may become a master by setting its master preference value sufficiently high. As a master, especially as the anchor master, it could change the discovery window schedule.

In some embodiments, during a discovery window on a rendezvous channel a master or other device (e.g., a non-selection master) may broadcast a different type of beacon called a synchronization beacon (SB). In these embodiments, synchronization beacons provide information that helps peer devices achieve or maintain synchronization—either with a master that issues regular DBs or with a non-selection master that devices may synchronize with to exchange data directly, for example. A synchronization beacon is typically sent during a discovery window, but generally will not be sent on a social channel unless, for example, one is sent during a discovery window that is occurring on a social channel.

A synchronization beacon may include any data that a discovery beacon might include, and/or other information. For example, an SB might be sent by a master to report that it will start using a different social channel for sending DBs, might be sent by a non-selection master to report that it will have a window of availability on a particular channel at a particular time, might be sent by another device to report synchronization data it heard from some other master or to advertise its availability, etc.

When a discovery window overlaps with the time a DB would normally be sent (i.e., according to the issuing master's DB period), the regular discovery beacon may be sent on the channel on which the discovery window is conducted (and not on the social channel). During discovery windows that do not overlap with the expiration of a master's DB period, the master may nonetheless send a synchronization beacon to ensure that devices synchronized with it have the necessary synchronization data without having to tune into a social channel for a regular DB. However, a device may still periodically listen on one or more social channels to learn of other masters and/or for other reasons.

Because peer devices having presence mode values greater than one may not attend every discovery window, but may be required to be present during discovery windows having sequence number 0, a master may by default always broadcast a DB or SB during those windows. Whereas DBs are short but frequent, SBs are longer and less frequent, and may pack extended service and device capability payloads.

It may be noted that discovery beacons are sent frequently, usually outside of discovery windows, in order to help non-synchronized devices synchronize with their peers. After a cluster of devices is synchronized, those devices may only (or primarily) meet during relatively sparse discovery windows, especially those devices that have adjusted their presence modes to use their radios less and thereby save power. To remain synchronized, these devices may rely on synchronization beacons sent during discovery windows.

In some embodiments, devices are required to implement guard periods at the beginning of some (or all) discovery windows, during which they listen and can receive communications, but do not transmit. In different embodiments, this restriction may or may not always apply to masters that issue regular DBs, but generally will always apply to non-selection masters.

Figure 2:
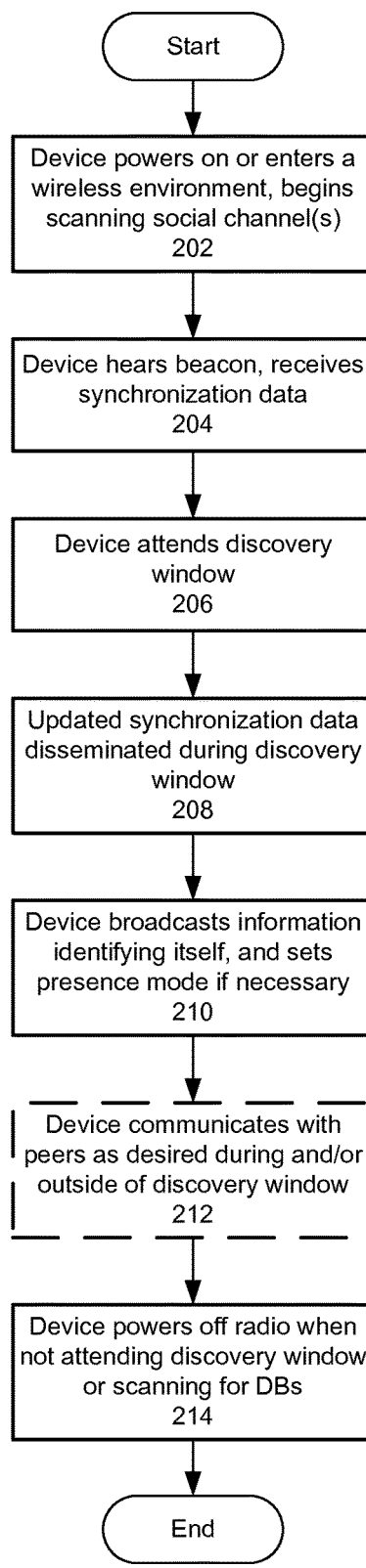
FIG. 2 is a flowchart demonstrating synchronization and operation of a device within a cluster of peers in a wireless communication environment, according to some embodiments.

FIG. 2 is a flowchart demonstrating synchronization and operation of a device within a cluster of peers in a wireless communication environment, according to some embodiments.

In operation 202, the device powers on or enters the cluster's environment and begins listening on one or more predetermined social channels for a discovery beacon (DB). It may be programmed with information regarding the default or possible periodicity of DBs, and may therefore only need to listen on a given social channel for a limited number of those periods (e.g., one, two) in order to intercept a DB broadcast by a master on that channel.

In operation 204, the device hears one or more DBs and extracts the offered synchronization data. In the illustrated embodiment, all DBs issued by masters within the same device cluster advertise the same discovery window sequence or schedule. The masters may transmit their DBs on the same or different social channels, and they may all conduct the discovery windows on the same channels.

If the device did not hear any discovery beacon, it may assume that there is no master within range. Therefore, it may take on the role of root master and begin issuing its own DBs in order to synchronize other devices in range.

In operation 206, the device tunes its radio to the specified channel and attends the next discovery window, assuming that its radio is not preempted by another application or service. If it cannot attend, the device will attend the next discovery window that it can, although it may need to listen on a social channel again to receive the next set of synchronization data and identify the rendezvous channel and starting time. The device may postpone attending a discovery window until the start of the next sequence of windows, and therefore tune into the next required window (usually a window having sequence number 0).

In operation 208, during a discovery window, a beacon containing synchronization data (e.g., a DB or an SB) is broadcast by the master with which the device is now synchronized. This may relieve the device of the need to scan one or more social channels. The beacon illustratively may be transmitted during an initial guard period or quiet period at the beginning of the discovery window, during which non-master devices may not transmit.

In operation 210, the device sets its presence mode if necessary or desired (e.g., if the device cannot attend the full sequence of discovery windows). During at least the first discovery window that it attends, and/or the first discovery window having sequence number 0, the device identifies itself (e.g., address, name, service information) in a message broadcast to all synchronized devices. It may advertise its presence mode at the same time.

In optional operation 212, the device may communicate directly with one or more of its synchronized peers during the discovery window and/or out-of-band, or they may communicate with the device. As discussed above, the device may extend its attendance at the window one or more times in order to facilitate the communications, will advertise to its active peers if and when it must leave the window before its normal termination (e.g., to use its radio for some other purpose), and may arrange a separate rendezvous (on the same or a different channel) with one or more peers.

In some embodiments, traffic reduction or limitation measures may be implemented during some or all discovery windows in order to reduce communication congestion and collisions. Illustratively, the master that controls the discovery window sequence may specify when a measure is in place. In some implementations, traffic reduction measures are only applied during discovery windows, and not during discovery window extensions. In mandatory availability windows (i.e., discovery windows having sequence number 0), traffic reduction measures may be mandatory.

By way of example, a traffic reduction measure may serve to limit a device regarding the number of multicast frames it may transmit during one discovery window (e.g., approximately three). Transmission of unicast frames may also be limited.

For example, unicast transmissions may only be permitted to (and/or from) devices having unknown presence mode values or values greater than one (or some other threshold). Limitations on unicast or multicast frame transmission may not apply to devices synchronizing among themselves (e.g., with a non-selection master) for a limited purpose, such as file transfer.

In operation 214, the device may power off its radio when not needed to listen for DBs on a social channel or to attend a discovery window.

The method depicted in FIG. 2 is merely illustrative, and does not limit methods according to other embodiments.

As described above, two or more peers may engage in their own synchronization, outside of or in addition to any discovery window. For example, one of them may assume the role of a non-selection master and issue synchronization beacons or other discovery beacons during a discovery window, to advise its peers as to when and where (i.e., time and channel) they may synchronize with it.

However, one peer may desire a short communication exchange with another peer without synchronizing. For example, a device synchronized within one cluster may wish to discover services offered by a peer (or peers) synchronized within a different (e.g., neighboring) cluster, a cluster device may wish to poll a neighboring peer or may wish to communicate some information to its master, etc. At least initially, they do not intend to engage in a significant exchange of data (e.g., as with a file transfer). Some embodiments provide this ability in the form of out-of-band inquiries and responses.

Figure 3:
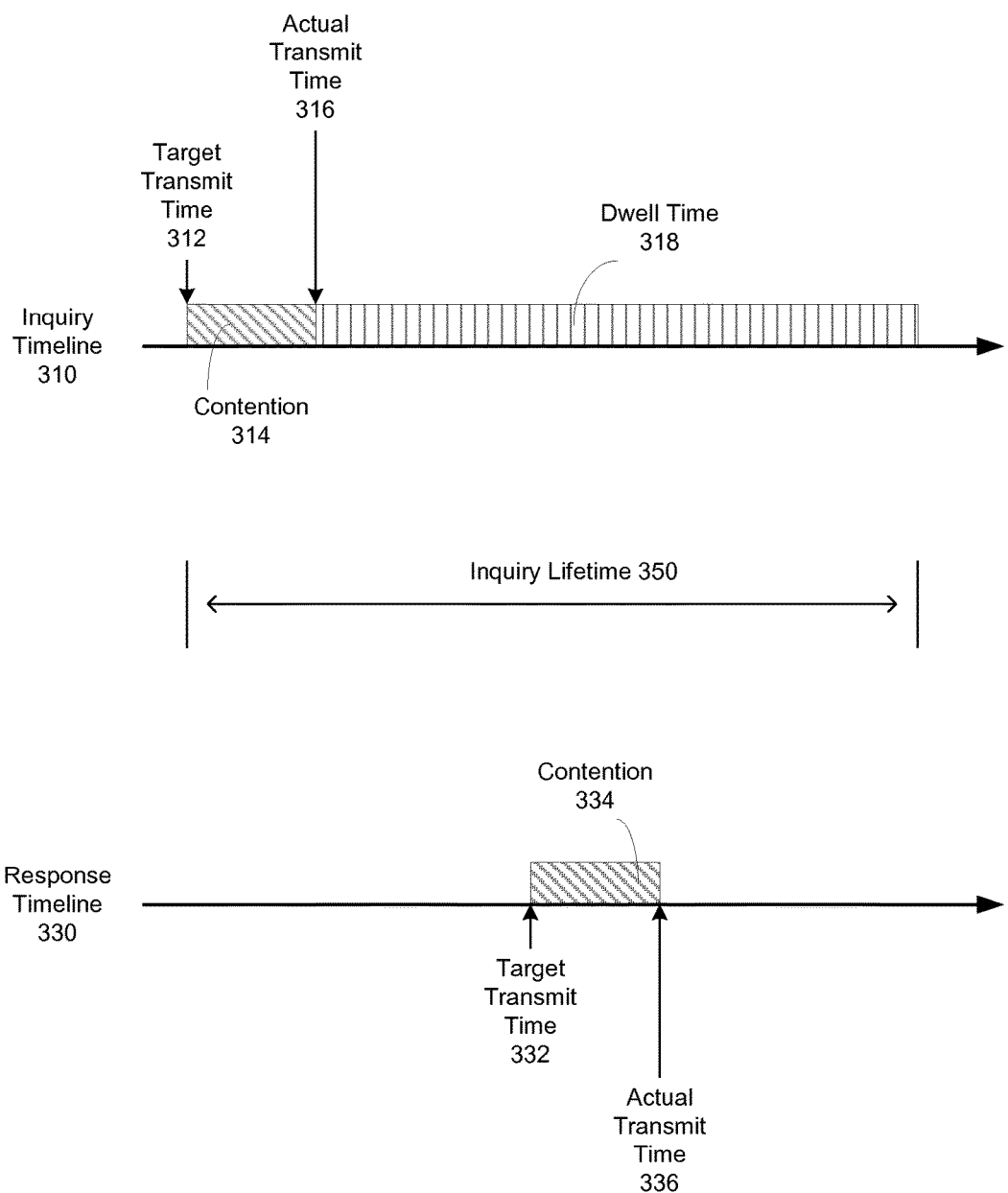
FIG. 3 is a diagram demonstrating an out-of-band exchange between peer devices, according to some embodiments.

FIG. 3 is a diagram demonstrating an out-of-band exchange between peer devices according to some embodiments. As with the timing of discovery beacons described above, the transmitting device must consider delay that will occur within itself, between the time it releases or prepares the inquiry for transmission and the time it is actually transmitted.

Inquiry timeline 310 reflects activity at the inquiring device, while response timeline 330 reflects activity at the responding peer device. When issuing the inquiry, the inquiring device must choose a suitable inquiry lifetime 350, such that the responding device will have time to receive, process and react to the inquiry.

In the illustrative inquiry and response, the inquiry is queued for transmission from the inquiring device at target transmission time 312. Because of contention for the antenna or the medium, and/or other delay (collectively represented as contention 314 in FIG. 3), the inquiry is not physically transmitted until actual transmit time 316.

Dwell time 318 is the remainder of the inquiry lifetime, during which the responding peer device must receive the inquiry and generate and transmit its response. The duration of dwell time 318 depends on the inquiry lifetime set by the inquiring device and the duration of contention 314. The responding device may also experience delay between its target transmit time 332 and the actual transmit time 336 of the response; this delay is represented as contention 334.

The inquiry may identify (in the out-of-band inquiry) any or all of the relevant time parameters (e.g., inquiry lifetime, target transmit time, actual transmit time, contention), so that the responding peer can determine whether it will be able to respond before the inquiry expires. If not, it may drop the inquiry or abort its response. If the inquiring device does not receive a response during the inquiry lifetime, it may retry (e.g., with a longer lifetime), abandon the inquiry, or take other action.

In some embodiments, a peer device may issue out-of-band inquiries to a master that it can hear, but which it is not synchronized to, in order to identify services offered by that master and/or devices synchronized to that station. In some implementations, it may relay information regarding other masters (or another cluster) to its master and/or synchronized peers, such as during one or more of their discovery windows. Information about another master, device or cluster that may be revealed may include things such as a social channel that it uses, its discovery window schedule (e.g., time, channel, period), (average) discovery beacon period, master offset, services it offers, address, etc. An out-of-band inquiry may thus function as a quasi-DB or quasi-SB, in that it may facilitate synchronization of one device to another.

Some unsynchronized masters (e.g., masters with which no peer devices have synchronized) may adopt a low-power mode of operation. This low-power mode of operation may be indicated in the station's discovery beacons, or may be inferred by the sequence or schedule of discovery windows and/or the presence mode advertised in the discovery beacons.

In one such mode of operation, an unsynchronized master may still send discovery beacons, but provide short discovery windows having long periods (e.g., multiple seconds). Because of the short, sparse nature of the discovery windows, it may take some time for a peer to discover services offered by the unsynchronized master.

During synchronization of peers within a communication environment according to some embodiments, as peer devices within a cluster are organized into a synchronization tree, non-master devices synchronize with sync masters within range; those synchronization masters (and possibly other non-master devices) synchronize with higher sync masters, and so on, with one anchor master at the top of the tree providing synchronization information for the entire environment. A non-master device may synchronize directly with the anchor master if it is in range.

An operating parameter of devices may specify the maximum depth of the cluster's synchronization tree, which may be defined as the number of levels or strata of masters. The anchor master's position is defined as stratum zero, and synchronization masters will reside in strata numbered 1 through D, wherein D is the maximum stratum at which a master may reside. The depth of the tree may be defined as D (or as D+1 to account for non-master devices), and the maximum number of hops between the anchor master and a non-master (e.g., leaf) device is D+1.

By default, while the cluster is being organized, a peer device may issue discovery beacons until it falls into position as a non-master, at which time it may or may not stop transmitting beacons. A device may choose to be a non-master device, even if the applicable selection algorithm could otherwise make it a master, unless there is no master in range of the device. If there is no master in range, the device must take on that role.

All masters continue to issue DBs to maintain synchronization within their areas, and may do so with a periodicity that is a function of its level, or stratum, within the cluster. For example, the anchor master at stratum 0 may issue DBs on the order of every 100 milliseconds (ms), a synchronization master at stratum 1 may issue DBs on the order of every 150 ms, a sync master at stratum 2 may issue DBs every 500 ms, and so on. These values are merely exemplary and in no way limit or restrict the duration of DB periods; masters within different strata may employ the same period, and masters in the same stratum may employ different periods.

A master's stratum will usually be reported within its DBs. This information allows a listening device to determine how deep the cluster is within its area of the cluster. Depending on that depth and/or other information (e.g., how many masters it can hear issuing DBs, the maximum cluster depth), the device may determine that it should be a non-master or that it should continue issuing DBs and remain a master.

A cluster's maximum depth parameter may be programmed into devices and/or advertised within discovery beacons and/or other beacons. Other restrictions may also be imposed, such as a maximum number of masters, a requirement that a master only continues in its role as long as it can hear no more than a threshold number of other masters (e.g., within a particular range, at a particular stratum, overall), etc.

For example, where the cluster's maximum depth is D, a master situated at stratum $S \geq 1$ (i.e., all strata except that of the anchor master) may only be allowed to hear D−S other masters operating in stratum S and still continue to serve as a master (assuming those other masters have higher or better master preference values). This provision may allow for concentration of higher level sync masters near the anchor master, and dispersion of synchronization masters further away.

In some embodiments, a master selection algorithm or process may prefer to retain an incumbent master over another device that would otherwise be given preference, unless the other device's master preference value exceeds the incumbent's by a threshold. This may help avoid thrashing or excessive switching of masters. However, because a master's principal task is simply to broadcast synchronization data, switching masters does not impose a high transaction cost on the cluster or an individual device.

In some embodiments, a device will synchronize with the best master that it can hear (i.e., the master having the highest master preference value), or the best master that it can hear within a given range (e.g., with a signal strength above a particular threshold), or the master situated in the lowest stratum of the hierarchical cluster (i.e., the master having the fewest hops to the anchor master).

When a device comes online in an environment and listens for discovery beacons, if it only hears from a synchronization master at the deepest or maximum permitted stratum of a cluster, it may synchronize to that station as a non-master. If, however, the device can also hear another master in a different cluster (e.g., as determined by the anchor master attributes advertised in a discovery beacon), it may favor joining that cluster if that other master is not at the maximum depth or stratum, or if that other master has a better master preference value.

A device that can only hear other devices relatively low in the cluster (e.g., with high strata values), may be able to determine that it is on the edge of the cluster. If most or all of the other devices are already at the maximum depth, a new cluster may spawn, especially if a device with a relatively high master preference value appears.

A new environment/cluster may also spawn when an existing one spans too large a spatial area. For example, a combination of the depth of the cluster, a measure of how close peer devices are and/or other factors, may cause a new cluster to be spawned. Signal strengths detected between peers may be one way of determining the proximity of peers.

Requiring peers to synchronize only with masters relatively close to them may cause the cluster to be relatively compact. In contrast, a high limit on the maximum depth of the tree may allow the cluster to cover more area. By adjusting these (and/or other parameters), a suitable cluster may be formed.

Different parameters for configuring a cluster will be suited to different environments, depending on the density of devices, the communication load and/or other factors. For example, if the load is relatively light (e.g., the devices are low-power sensors), drawbacks associated with a hidden node problem should be limited and a relatively deep cluster may be implemented (e.g., on the order of ten to fifteen levels). Also, in sparser environments, a process for selecting masters may resolve faster.

The hidden node problem refers to a scenario in which multiple devices that are not in range of each other try to communicate with a common peer. Because they cannot hear each other's transmissions they cannot avoid them, and their communications to the common peer may collide. Although this may be exacerbated by the need to communicate during a relatively short period of time (e.g., within a discovery window), a light load may help mitigate the problem and allow a deeper cluster than would be possible in a denser environment with a heavier load.

Without a method of synchronization described herein, the total number of discovery beacons or frames needed to discover all devices in an environment could approach the square of the number of devices (i.e., each device might need to send at least one frame to every other device). These frames would be sent at random times and on any channels.

In contrast, the collective synchronization afforded by some embodiments enables synchronization based on regular transmissions from a select set of devices (i.e., masters), and scales well. In a perfectly synchronized environment, the number of frames needed for all devices to discover each other is proportional to the number of devices. One discovery beacon broadcast during a discovery window having sequence number 0 will reach all other devices in range.

Operating a Cluster

As described above, operation of a cluster of peer devices is rooted in establishing and maintaining synchronization of the devices. Synchronization parameters are issued by the anchor master and disseminated throughout the cluster via discovery beacons and/or other communications. Using those parameters, the devices rendezvous during discovery windows to discover peer devices and available services, communicate with peers and/or for other purposes.

In some embodiments, devices are programmed with default synchronization parameters that may include (average) discovery beacon period, identities of social channels to use for discovery beacons, discovery window parameters (e.g., channel(s), period, duration), etc. When two or more clusters of devices come into proximity, their synchronization parameters may potentially conflict.

For example, two clusters may come into proximity because the devices of one (small) cluster move into a spatial region in which the other cluster is operating, or because one or both clusters grew in size until devices of both clusters are within communication range of each other.

If the anchor masters of the two clusters are using some of the same parameters, such as discovery window channel and period, some or all discovery windows of the two clusters may overlap. In this case, and because each cluster's devices are configured to conduct multicast traffic during discovery windows, there may be communication collisions.

Therefore, in some embodiments, peer devices acting as anchor masters are configured to change one or more parameters of their cluster's discovery window schedule to eliminate the overlap and prevent collisions. In different implementations, different criteria may be used to determine which of multiple anchor masters are to alter their discovery window schedules, but the decision will be deterministic so that all of the anchor masters involved know whether or not they are to change anything.

For example, in one implementation, the anchor master having the lower or lowest master preference value will change its schedule, while the other anchor master(s) will not. In another implementation, the anchor master of the smaller cluster (e.g., as determined by number of cluster members) or the cluster that is shallower or the shallowest (e.g., as measured by maximum hop count from anchor master to another device in the same cluster) may change. An illustrative method of estimating or determining the size of a cluster is described below.

When two or more clusters are in conflict (i.e., have overlapping discovery windows), different corrective action may be taken in different embodiments. For example, an anchor master may adjust the period of its cluster's discovery windows one or more times, but remain on the same channel(s), until it has a sequence that does not overlap any neighboring cluster.

However, in some embodiments, all clusters (and all devices) are configured to implement the same discovery window period. Therefore, an anchor master may alternatively just change the channel(s) on which some or all discovery windows are conducted.

In other embodiments, an anchor master may alter its schedule by configuring its discovery window sequence such that each of its cluster's discovery windows commences at the end of another cluster's window. For example, multiple anchor masters may determine which of them has priority over the others. The highest priority or dominant anchor master does not change its schedule, but the other(s) may change their schedules so that, for example, discovery windows of the anchor master having second priority start upon termination of the windows of the dominant anchor master, discovery windows of the anchor master having third priority start upon termination of the windows of the anchor having second priority, and so on. Illustratively, when an anchor master of one cluster learns of a conflict with a neighboring cluster, it may determine its preference relative to the other and set its discovery window schedule accordingly.

As another option, anchor masters that must adjust their schedules (i.e., all except the dominant anchor master) may do so by adding or subtracting a short period of time to the commencement of one or more subsequent discovery windows (to avoid a conflicting cluster's next window), and then resume the same discovery window period. Illustratively, the period of time by which an anchor master adjusts its discovery window may be a multiple of a current or default discovery window duration (which may be on the order of 16 ms, 32 ms or 50 ms).

In some embodiments, an anchor master learns of a conflict (between its cluster's discovery window schedule and that of another cluster) via information reported to it by another member of its cluster. In this embodiment, some or all non-master devices transmit periodic beacons or frames that do not solicit other peers to synchronize with the issuing device, but which communicate useful information for operating the cluster. As described previously, a device that hears such information from a peer may repeat it, and in this manner information reported by a device at the edge of a cluster can be conveyed to the cluster's anchor master. For example, data reported by a non-master device may be repeated in its sync master's discovery beacons, and then repeated by the next-higher sync master, and so on.

Figures 4, 5:
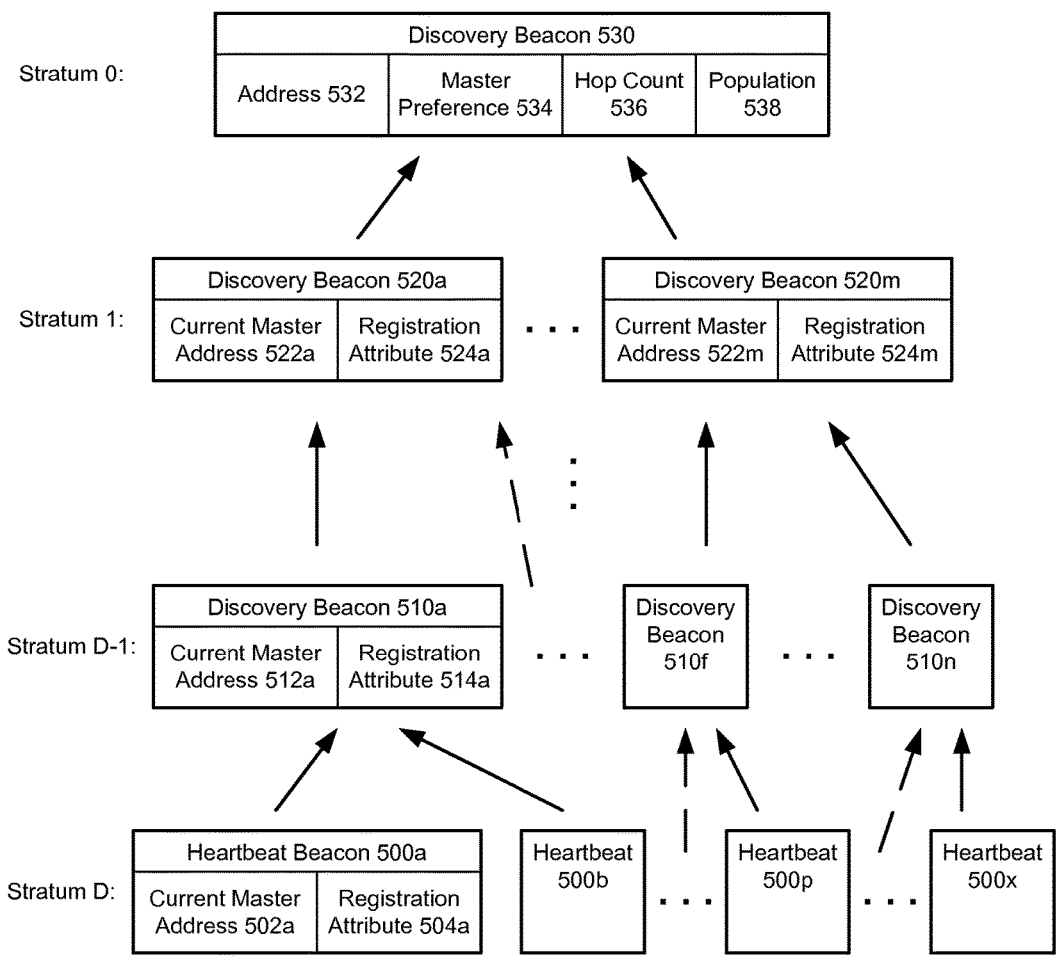
FIG. 4 is a diagram of an illustrative communication for disseminating information concerning operation of a cluster, according to some embodiments.
FIG. 5 demonstrates reporting of cluster population upward toward the anchor master, according to some embodiments.

FIG. 4 is a diagram of an illustrative communication for disseminating information concerning operation of a cluster, according to some embodiments.

Communication 400 may be a beacon or part of a beacon issued by a non-master device and/or part of a discovery beacon or synchronization beacon issued by a synchronization master, and concerns a nearby foreign cluster (i.e., a cluster that is not the cluster of the device issuing communication 400). Communication 400 includes anchor master preference value 402, anchor master address (or other identity) 404, cluster size 406, hop count 408, and window time offset 410. Any or all of these parameters may be learned from beacons or frames of a master device or a non-master device of the foreign cluster.

Anchor master preference value 402 is the master preference value of the foreign cluster's anchor master. As described in the previous section, a master preference value indicates a master's suitability or preference for being a master. Generally, the higher a device's master preference value, the more likely it will be (or is) a master. Anchor master address 404 is an address (e.g., MAC address) of the foreign cluster's anchor master.

Cluster size 406 identifies a number of devices in the foreign cluster, and may or may not be exact (e.g., devices may regularly join and leave a given cluster). As described below, a cluster's size may be identified in discovery beacons and/or other communications broadcast by cluster members. Hop count 408 identifies the number of hops from the anchor master of the foreign cluster to the device that issued the beacon (or other communication) from which the information of communication 400 was learned.

Time offset 410 is an offset to the start of the foreign cluster's next discovery window, from the start of the local cluster's next discovery window as set and advertised by the local cluster's anchor master. This time offset will be reported further (i.e., as the information of communication 400 is relayed to the anchor master of the device that initiated communication 400) so that the anchor master can determine when the foreign cluster's discovery window will commence. Because each cluster is synchronized according to its own anchor master's clock, which will drift over time, periodic updates or adjustments may be required to ensure discovery windows of different clusters remain non-overlapping.

Other information that may be part of a communication configured to convey information to or for the reporting device's anchor master may include, instead of or in addition to the contents of communication 400, a foreign cluster's discovery window schedule (e.g., channel(s), period, duration), data regarding the foreign device that broadcast the beacon from which the reporting device learned of the foreign cluster's parameters, and/or other information.

Each master device that receives communication 400 is required to propagate it, so that eventually it reaches the anchor master.

In some embodiments, to aid in communication of useful information upward through a cluster's hierarchical structure, non-master devices issue periodic beacons or frames which may be termed heartbeats. A heartbeat beacon may include some or all of the content of communication 400 of FIG. 4 (e.g., if the issuing device hears a discovery beacon of a master in a foreign cluster), and/or may convey other information.

For example, in some embodiments, heartbeat beacons are configured to assist in the measure or estimation of the size of a cluster (i.e., the number of peer devices participating in the cluster). In these embodiments, a heartbeat beacon issued by a non-master device reports an identity (e.g., address) of the master with which the non-master device is synchronized (i.e., the master from which the non-master device obtains synchronization parameters and takes its clock).

Each synchronization master in the cluster counts the number of devices that are reporting that sync master as its master (i.e., zero or more) and, in its discovery beacons, synchronization beacons and/or other beacons (e.g., its own heartbeat beacons), reports that number (plus one for itself) and the address of its superior master. This scheme continues up to the anchor master, which receives reports from all stratum 1 sync masters (and any non-master devices that may be directly synchronized to it). The anchor master can then sum the number of devices reported to it, and add one for itself, to determine the (approximate) size of its cluster. Depending on the rate or frequency with which devices join and depart the cluster, the measured size may quickly (or slowly) become obsolete.

FIG. 5 demonstrates reporting of cluster population upward toward the anchor master, according to some embodiments.

In these embodiments, non-master devices issue periodic heartbeat beacons 500 (e.g., 500a, 500b, 500p, 500x) for consumption by the sync masters with which they have synchronized. In each heartbeat 500 is current master address or identity 502 (e.g., address 502a), which reports the address (or other identity) of that sync master, and registration attribute 504 (e.g., attribute 504a), which identifies the number of devices encompassed by the heartbeat. Because heartbeat beacons 500 are issued by non-masters, registration attribute 504 will be one, which means each of the non-masters is reporting just for itself.

Stratum D represents the lowest level of the logical hierarchy of devices in the cluster, wherein the integer value D is the number of hops between the cluster's anchor master and the furthest device. Although some non-master devices will likely be at other strata (e.g., strata 1 through D−1), in the illustrated environment at least some are at stratum D.

At stratum D−1, synchronization masters identified in heartbeat beacons 500 consume heartbeats that identify them, and aggregate all the registration attributes of those heartbeats. They then add one to the sum and use the resulting value as registration attribute 514 (e.g., attribute 514a) for discovery beacons 510 (beacons 510a, 510f, 510n) and/or other beacons. Discovery beacons 510 also include current master address or identity 512 (e.g. address 512a) to identify their superior sync masters. Thus, at stratum D−1, sync masters combine what they glean from devices at stratum D and report in their discovery beacons the number of devices they know of (including themselves) in strata D and D−1.

This process continues through any number of strata between stratum D−1 and stratum 1. Of course in shallow clusters, there may be fewer than four strata, in which case a similar process will occur on a smaller scale.

At stratum 1, registration attributes reported by devices at lower levels in the cluster (i.e., devices further from the anchor master) are aggregated, incremented by one to account for the sync master performing the aggregation, and announced within discovery beacons 520 (beacons 520a, 520m) as registration attributes 524 (attributes 524a, 524m). Discovery beacons 520 also include current master address 522 (addresses 522a, 522m), which will be the same in all beacons 520 and match an address or other identity of the cluster's anchor master.

Finally, at stratum 0, the anchor master consumes registration attributes 524a-524m and adds one to determine the size of its cluster. The anchor master can then issue discovery beacon 530 to report address 532 (the anchor master's address), master preference value 534 (of the anchor master), hop count 536, and population 538 (i.e., the number of devices in the cluster). In some implementations, hop count 536 of discovery beacon 530 is zero, which indicates to any device that hears it that the beacon was issued by the anchor master.

In a cluster of only one stratum, there is only one device and it can easily measure its cluster size (i.e., 1). In a cluster of two strata, devices will synchronize with, and report themselves directly to, the anchor master. In deeper clusters, as in FIG. 5, at least one level of synchronization masters will operate to count a number of subordinate devices via heartbeat beacons (and/or other beacons) and report upward via discovery beacons, synchronization beacons, and/or other beacons or communications.

In some embodiments, devices may appear and disappear, and/or may bounce between synchronization with one master and synchronization with another, due to fluctuating signal strengths, propagation patterns, environmental conditions (e.g., interfering signals, obstructions such as walls and floors), etc. Therefore, hysteresis may be applied to smooth out the pattern of rapid and frequent fluctuation in numbers of registered devices that would otherwise be reported by a master. In different implementations, different corrective measures may be applied at a given master.

For example, when counting the number of subordinate devices to report in the registration attribute of its discovery beacons, a given master may add to the count the registration attribute reported by a device that newly claims the given master as its current master only after that device reports the same current master address in some number of successive beacons (e.g., 3) or for some period of time (e.g., 1 second); similarly, the registration attribute of a subordinate device that is no longer reporting the given master as its current master may be discounted (i.e., not counted) only after some number of expected beacons or some period of time.

Although the discovery beacons (and heartbeat beacons) of FIG. 5 are described as primarily conveying information for measuring the size of the cluster, these discovery beacons may be the same discovery beacons in which the issuing masters provide synchronization parameters (e.g., discovery window channel, discovery window period, discovery window duration, offset to next discovery window), identify their master preference values, report hop counts, etc.

In some embodiments, sync masters' hop counts may be derived from hop count 536 of discovery beacon 530. In particular, stratum one sync masters will consume discovery beacon 530, understand that it was issued by the anchor master, adopt/copy synchronization parameters of the anchor master (which may be included in discovery beacon 530), increment the hop count by one and use that value as the hop count reported in their own discovery beacons. Thus, every device below the anchor master can determine its own depth in the cluster by reading the hop count reported by the master with which it is synchronized.

In some embodiments, the size of a cluster of peer devices may be measured or determined in some other way. For example, instead of broadcasting (or multicasting) heartbeat beacons, a peer device may report the number of subordinate devices that are synchronized with it via an out-of-band communication. Thus, every non-master device reports itself to the master with which it has synchronized; that master reports to its superior master, and so on.

In some embodiments, a procedure or algorithm described in U.S. patent application Ser. No. 13/657,707 for determining how to rank or compare peer devices may be modified to consider the size of the devices' cluster or clusters. Illustratively, such ranking may be performed in order to determine which device(s) among two or more candidates should act as or be selected as master(s), for determining which master a (new) device should synchronize with, and/or for other purposes.

For example, illustrative rules discussed in U.S. patent application Ser. No. 13/657,707 may be amended so that when two devices have the same anchor master (i.e., they are in the same cluster), their own hop counts (i.e., distances from the anchor master) are compared and the device having the smaller (or, alternatively, larger) hop count is ranked higher. If their hop counts are equal, then a tie-breaking process is invoked, which may involve comparing their MAC addresses or some other unique indicia.

The illustrative rules may be further amended so that when two devices have different anchor masters (i.e., they are in different clusters), first the master preference values of those anchor masters are compared and the device having the anchor master with the higher (or, alternatively, lower) value is ranked higher. Second, if their anchor masters have equal master preference values, the size of each device's cluster may be compared and the device that is part of the larger cluster (or, alternatively, smaller) cluster is ranked higher. If the sizes are equal, then the tie-breaking process may be invoked. In some implementations, the first and second steps of this amendment to the rules may be reversed.

A Peer Device

Figure 6:
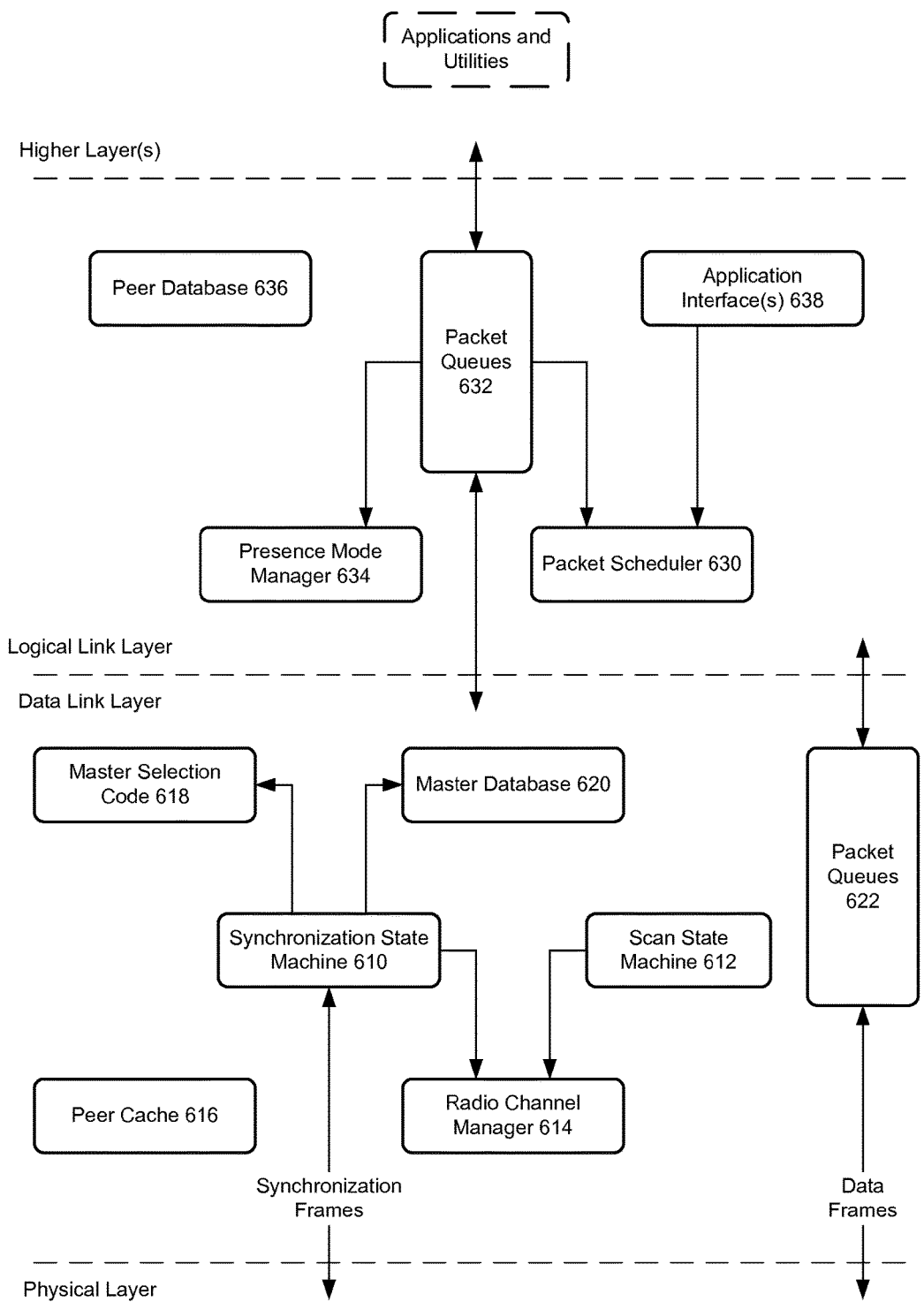
FIG. 6 is a block diagram of a peer device, according to some embodiments.

FIG. 6 is a block diagram of a peer communication device, according to some embodiments. Two primary protocol layers or operating layers are depicted in FIG. 6—the Logical Link Layer and the Data Link Layer. Above the logical link layer one or more applications and/or utilities (e.g., mDNS, Bonjour) may operate; below the data link layer is the Physical Layer, responsible for transmitting frames over, and receiving frames from, the transmission medium.

In some embodiments, the logical link layer and data link layer may be physically implemented by separate processors or by integrated circuits residing on a single component. In the illustrative communication device of FIG. 6, some components of the device are omitted in the interest of clarity, such as processor, memory, display, antenna and communication port components, among others.

Within the data link layer, synchronization frames (e.g., discovery beacons or DBs, synchronization beacons or SBs) are issued by and/or received by synchronization state machine 610. Incoming synchronization frames are routed to master database 620 and then passed upward to the logical link layer. Data frames are handled by packet queues 622.

Synchronization state machine 610 has two modes—master and non-master—and runs continuously in some implementations. As discussed earlier, a master device is a device that issues discovery beacons and/or synchronization beacons to facilitate device synchronization, while a non-master device may issue some type of beacon and may or may not solicit other devices to synchronize with it.

The state machine is responsible for synchronization of the peer device to its current master. If the device is a master, state machine 610 manages its transmission of discovery beacons and/or synchronization beacons, and also manages its discovery window presence.

Scan state machine 612 scans social channels for beacons. Radio channel manager 614 manages radio resources (e.g., a shared antenna) with other entities (e.g., an infrastructure module) and between different radios (e.g., Wi-Fi, Bluetooth). Synchronization state machine 610 interacts with radio channel manager 614 to switch the device's radio to the correct channel for a discovery window, at the appropriate time. Scan state machine 612 and/or other components of the device may interact with the radio channel manager for other purposes (e.g., scanning a channel for new devices).

Peer cache 616 stores relevant information of a limited number of other devices with whom the host peer device is communicating or is about to communicate. Use of this cache may help alleviate problems associated with memory restrictions in some hardware/firmware implementations. For example, the data link layer may be implemented by a dedicated Wi-Fi chipset, which typically does not have access to large memory banks. Information in peer cache 616 is synchronized with information in peer database 636.

Master selection code 618 is periodically executed to perform a selection process for selecting or identifying master devices, using information from peer database 636 and/or other information. For example, execution of the code may cause a ranking of devices in master database 620, based on their suitability to be a master.

Master database 620 stores data regarding all masters that the peer device is aware of. Such data may be used for synchronization and/or master selection, and may include, but is not limited to, RSSI (Received Signal Strength Indication) (e.g., of the latest frame, average of multiple frames, minimum, maximum), master preference values, selection metrics used to calculate master preference values, cluster size and synchronization parameters.

In some embodiments, master database 620 is populated or updated, and master selection code 618 executed, upon receipt of every discovery beacon.

Packet queues 622 of the data link layer store incoming and/or outgoing data frames. Packet queues 632 of the logical link layer store peer traffic incoming from, and outgoing to, other devices.

Packet scheduler 630 schedules multicast, broadcast and unicast traffic to synchronized devices, and out-of-band inquiries/responses to masters with which the peer is not synchronized ("non-synchronized masters") and to devices synchronized with non-synchronized masters. Peer database 636 stores information regarding the non-synchronized masters' discovery windows, presence modes, and other timing-related information.

Presence mode manager 634 controls the peer device's presence mode, based on factors that may include, but that are not limited to: current active data links to synchronized devices, current data rates to those devices, scan requirements, out-of-band inquiry requirements, power management state, Bluetooth requirements, other radio requirements, etc.

Peer database 636 identifies all devices known to the peer device illustrated in FIG. 6, and stores information regarding each device. This information may include, but is not limited to, its identity (e.g., network address), its anchor master's identity, master preference value, capabilities (e.g., supported frequency bands, channel bandwidths, modulation/data rates), presence mode, services supported by the device, outstanding block ACK agreements, and so on. Peer database 636 may thus assist in a master selection process by providing a list of candidate devices that can be ordered by master preference value and/or other criteria.

Application interface(s) 638 include interfaces to higher system layers and modules, which may include but are not limited to: configuration and network management, a GUI (Graphical User Interface), service advertisement and discovery, and so on. The GUI may present a device user with a list of surrounding peers, their physical proximities, range or signal strengths, lists of their service, and/or other information.

The configuration of the peer device presented in FIG. 6 is exemplary. In other embodiments a peer device's configuration may differ to varying degrees. For example, functions of the components of the peer device of FIG. 6 may be combined in a different manner, those of a single component may be subdivided, and/or those of multiple components may be merged.

In some embodiments, a peer device includes an application processor to support applications (e.g., the applications and utilities residing in higher layers in FIG. 6). The application processor provides memory management, graphics processing and/or other functions needed by the applications. The peer device in some embodiments also includes a wireless interface, such as a baseband processor, for performing wireless communications, along with corresponding memory and a transceiver for supporting the wireless communications and communications processing.

The wireless interface may include all of the components depicted in the logical link layer and data link layers of FIG. 6 and the functionality described in conjunction with those components. The wireless interface may also handle some tasks normally associated with the physical layer (e.g., channel coding).

Thus, in some embodiments, a "communication module" or "wireless communication module" of a peer device may refer to a robust wireless interface component described immediately above. In some other embodiments, a communication module may encompass a baseband processor and a corresponding wireless transceiver for operating or managing an antenna of the device, and possibly memory used by the baseband processor. In yet other embodiments, a communication module may encompass the components of the logical link layer and data link layer of FIG. 6, and other components necessary to transmit and receive data to and from the peer device.

Some embodiments promote coexistence of a peer-to-peer communication protocol, as described herein, with other applications that require the radio or other communication resources of a peer device. For example, the device may operate an application or another protocol, such as Bluetooth®.

In these embodiments, Bluetooth communications can be performed as desired, except during the device's discovery window and any extensions thereto. Outside of the discovery window, Bluetooth scans, inquiries and/or other operations are allowed, and may even take priority over data frames adhering according to a protocol provided here.

A master's discovery beacon may be delayed because of a Bluetooth (or other application/protocol) operation using the device's antenna, but normally will not be dropped. Bluetooth or other operations may not be permitted during out-of-band inquiries and responses.

Synchronization and operation of peer devices as provided herein can also coexist with an application or protocol that relies on some communication infrastructure (e.g., an access point) not part of the device cluster.

The environment in which some embodiments are executed may incorporate a general-purpose computer or a special-purpose device such as a hand-held computer, smart phone or other mobile device. Details of such devices (e.g., processor, memory, data storage, display) may be omitted for the sake of clarity.

The data structures and code described in this detailed description are typically stored on a computer-readable storage medium, which may be any device or medium that can store code and/or data for use by a computer system. The computer-readable storage medium includes, but is not limited to, non-volatile memory, magnetic and optical storage devices such as disk drives, magnetic tape, CDs (compact discs), DVDs (digital versatile discs or digital video discs), or other media capable of storing computer-readable media now known or later developed.

The methods and processes described in the detailed description can be embodied as code and/or data, which can be stored in a computer-readable storage medium as described above. When a computer system reads and executes the code and/or data stored on the computer-readable storage medium, the computer system performs the methods and processes embodied as data structures and code and stored within the computer-readable storage medium.

Furthermore, the methods and processes described below can be included in hardware modules. For example, the hardware modules may include, but are not limited to, application-specific integrated circuit (ASIC) chips, field-programmable gate arrays (FPGAs) and other programmable-logic devices now known or later developed. When the hardware modules are activated, the hardware modules perform the methods and processes included within the hardware modules.

The foregoing descriptions of embodiments have been presented for purposes of illustration and description only. They are not intended to be exhaustive or to limit the disclosure. Accordingly, many modifications and variations will be apparent to practitioners skilled in the art. The scope is defined by the appended claims, not the preceding disclosure.

What is claimed is:

1. A device, comprising:
   a processor; and
   a memory configured to store:
      an identity of a current master of the device; and
      synchronization parameters to facilitate synchronization with one or more peer devices, wherein the synchronization parameters comprise information configured to allow a listening device to learn of a sequence of discovery windows that has been imposed by the current master, wherein the synchronization parameters were included in one or more beacons transmitted by the current master of the device and comprise at least one of: a channel on which one or more of the discovery windows will occur, a period of the discovery windows, a starting time of a next discovery window, or a duration of the discovery windows;
   wherein the processor is configured to:
      utilize the synchronization parameters to attend a rendezvous of the one or more peer devices;
      synchronize with the one or more peer devices to form a cluster of devices;
      detect one or more parameters of a foreign cluster of devices, wherein the one or more parameters from the foreign cluster of devices were included in one or more beacons transmitted by a master of the foreign cluster of devices that is different from the current master of the device;
      inform at least one peer device of the one or more parameters of the foreign cluster of devices; and
      receive adjusted synchronization parameters to resolve a conflict with the one or more parameters of the foreign cluster of devices.

2. The device of claim 1, wherein the one or more parameters of the foreign cluster of devices comprise at least a discovery window schedule of the foreign cluster.

3. The device of claim 1, wherein the adjusted synchronization parameters comprise a first schedule of periodic rendezvous of the one or more peer devices that does not overlap with a second schedule of periodic rendezvous of the foreign cluster of devices.

4. A method of operating a synchronized cluster of peer devices, the method comprising, at a first peer device:
   applying synchronization parameters of the cluster of peer devices to maintain synchronization with one or more peer devices of the cluster of peer devices, wherein the synchronization parameters comprise information configured to allow a listening device to learn of a sequence of discovery windows that has been imposed by the first peer device,
   wherein the synchronization parameters were included in one or more beacons transmitted by the first peer device within the cluster of peer devices and comprise at least one of: a channel on which one or more of the discovery windows will occur, a period of the discovery windows, a starting time of a next discovery window, or a duration of the discovery windows;
   utilize the synchronization parameters to attend a rendezvous of the one or more peer devices;
   detecting parameters of a foreign cluster of devices wherein the parameters from the foreign cluster of devices were included in one or more beacons transmitted by a master of the foreign cluster of devices that is different from the first peer device within the cluster of peer devices;
   reporting the parameters of the foreign cluster of devices to the one or more peer devices;
   adjusting the synchronization parameters to resolve a conflict with the parameters of the foreign cluster of devices; and
   transmitting a beacon to the one or more peer devices wherein the adjusted synchronization parameters are included into the beacon.

5. The method of claim 4, further comprising:
   determining that the parameters of the foreign cluster of devices conflict with the synchronization parameters; and
   determining a ranking between the first peer device and an anchor master of the foreign cluster of devices.

6. The method of claim 5, further comprising:
   determining that the anchor master of the foreign cluster of devices ranks higher than the first peer device.

7. The method of claim 4, wherein reporting the parameters of the foreign cluster of devices comprises:
   transmitting one or more beacons containing the parameters of the foreign cluster, wherein the one or more beacons identify an anchor master of the cluster of peer devices.

8. The method of claim 4, wherein adjusting the synchronization parameters comprises adjusting at least one of a channel of the sequence of discovery windows of the cluster of peer devices and a period of the sequence of discovery windows of the cluster of peer devices.

9. The method of claim 4, wherein adjusting the synchronization parameters comprises:
   determining that a number of devices in the cluster of devices is less than a number of devices in the foreign cluster of devices.

10. A non-transitory computer-readable medium storing instructions that, when executed by a computer, cause the computer to perform a method of operating a synchronized cluster of peer devices, the method comprising, at a first peer device:
   applying synchronization parameters of the cluster of peer devices to maintain synchronization with one or more peer devices of the cluster of peer devices, wherein the synchronization parameters comprise information configured to allow a listening device to learn of a sequence of discovery windows that has been imposed by the first peer device, wherein the synchronization parameters were included in one or more beacons transmitted by the first peer device within the cluster of peer devices and comprise at least one of: a channel on which one or more of the discovery windows will occur, a period of the discovery windows, a starting time of a next discovery window, or a duration of the discovery windows;

utilize the synchronization parameters to attend a rendezvous of the one or more peer devices;

detecting parameters of a foreign cluster of devices wherein the parameters from the foreign cluster of devices were included in one or more beacons transmitted by a master of the foreign cluster of devices that is different from the master device within the cluster of peer devices;

reporting the parameters of the foreign cluster of devices to the one or more peer devices;

adjusting the synchronization parameters to resolve a conflict with the parameters of the foreign cluster of devices; and transmitting a beacon to the one or more peer devices wherein the adjusted synchronization parameters are included into the beacon.

11. A device, comprising:

a processor;

a memory configured to store synchronization parameters to facilitate synchronization with one or more peer devices; and a wireless transceiver for conducting wireless communications, wherein the processor and the wireless transceiver are configured to:

synchronize the device with the one or more subordinate peer devices to form a synchronized cluster of devices, wherein synchronizing the device uses synchronization parameters that comprise information configured to allow a listening device to learn of a sequence of discovery windows, wherein the synchronization parameters are included in one or more beacons transmitted by the device to the one or more subordinate peer devices and comprise at least one of a channel on which one or more of the discovery windows will occur, a period of the discovery windows, a starting time of a next discovery window, or a duration of the discovery windows;

utilize the synchronization parameters to attend a rendezvous of the one or more subordinate peer devices;

determine that the one or more subordinate peer devices satisfy a predetermined condition, wherein the predetermined condition includes an indication in two or more successive beacons from the subordinate devices that the device is their master;

in response to the determination, tally a number of the one or more subordinate peer devices within the cluster of devices;

increment the tally to account for the device;

report the incremented tally, wherein a beacon is generated comprising the tally and the synchronization parameters; and transmit the beacon to at least one of a superior device and the one or more subordinate peer devices.

12. The device of claim 11, wherein:

the one or more subordinate peer devices comprise one or more subordinate master peer devices, and to tally the number of the one or more subordinate peer devices within the cluster, the processor and the wireless transceiver are further configured to receive from each subordinate master peer device synchronized with the device a first value identifying a number of devices synchronized with the subordinate master peer device.

13. The device of claim 12, wherein:

the one or more subordinate peer devices comprise one or more subordinate non-master peer devices, and to tally the number of the one or more subordinate peer devices within the cluster, the processor and the wireless transceiver are further configured to receive, from each subordinate non-master peer device synchronized with the device, a communication identifying the device as a synchronization master of the non-master peer device.

14. The device of claim 13, wherein the communication received from a first subordinate non-master peer device comprises a heartbeat beacon.

15. A method of operating a synchronized cluster of peer devices, the method comprising, at a first peer device:

synchronizing with a plurality of subordinate peer devices to form the synchronized cluster of peer devices using synchronization parameters that comprise information configured to allow a listening device to learn of a sequence of discovery windows, wherein the synchronization parameters are included in one or more beacons transmitted by the first peer device to the one or more subordinate peer devices and comprise at least one of: a channel on which one or more of the discovery windows will occur, a period of the discovery windows, a starting time of a next discovery window, or a duration of the discovery windows;

utilize the synchronization parameters to attend a rendezvous of the one or more subordinate peer devices;

receiving, from each subordinate peer device, a first value identifying a number of peer devices synchronized with the subordinate peer device;

determining that the subordinate peer devices satisfy a predetermined condition, wherein the predetermined condition includes an indication in two or more successive beacons from the subordinate devices that the first peer device is their master;

in response to the determination, summing the first values received from the subordinate peer devices;

incrementing the sum of the first values by one;

reporting the incremented sum, wherein a beacon is generated comprising the incremented sum and the synchronization parameters; and transmit the beacon to a superior peer device with which the first peer device is synchronized.

16. The method of claim 15, wherein the beacon further comprises the synchronization parameters and a hop count.

17. The method of claim 16, further comprising:

after reporting the incremented sum, incrementing the hop count; and transmitting a new beacon including the incremented hop count and the synchronization parameters.

18. The method of claim 15, wherein receiving the first value comprises receiving a communication from each of the subordinate peer devices identifying the first peer device as a synchronization master of the subordinate peer devices.

19. The method of claim 18, wherein the communication comprises a heartbeat beacon.

20. The method of claim 15, wherein the beacon further comprises an identity of the first peer device and a master preference of the first peer device.

21. The method of claim 15, wherein receiving the first value comprises receiving a communication from each of the subordinate peer devices and the communication comprises a discovery beacon.

22. The method of claim 15, wherein reporting the incremented sum to the superior device comprises:
generating a beacon comprising the incremented sum and an identity of the superior device; and
transmitting the beacon.

23. A network of peer communication devices, comprising:
an anchor master having a highest master preference value among the peer communication devices in a logical hierarchy;
a first stratum comprising a sync master having a master preference value lower than the highest master preference value of the anchor master,
wherein the anchor master and the sync master are configured to transmit discovery beacons to identify the highest master preference value of the anchor master and to synchronize the logical hierarchy,
wherein a discovery beacon transmitted by the anchor master comprises a sum of number of peer communication devices synchronized with the anchor master;
wherein a discovery beacon transmitted by the sync master comprises a sum of number of peer communication devices synchronized with the sync master;
wherein the discovery beacons each comprise synchronization parameters comprising information configured to allow a listening device to learn of a sequence of discovery windows, and wherein the information comprises at least one of: a channel on which one or more of the discovery windows will occur, a period of the discovery windows, a starting time of a next discovery window, or a duration of the discovery windows; and
a second stratum comprising a non-master peer communication device configured to transmit a heartbeat beacon,
wherein the sync master is configured to determine that the non-master peer communication device satisfies a predetermined condition, wherein the predetermined condition includes an indication in two or more successive heartbeat beacons from the non-master peer communication device that the sync master is its master, and in response to the determination, increase a number of peer devices that are synchronized with the sync master, and
wherein upon detecting parameters of a foreign cluster of devices, the anchor master is configured to determine a priority between the anchor master of a foreign cluster of devices and adjust the synchronization parameters to resolve a conflict with the parameters of the foreign cluster of devices.

24. The network of claim 23, wherein to adjust the synchronization parameters, the anchor master is further configured to configure a first schedule of periodic rendezvous of the peer communication devices to eliminate an overlap with a second schedule of periodic rendezvous of the foreign cluster of devices.

25. The network of claim 24, wherein to configure the first schedule of periodic rendezvous, the anchor master is further configured to set the first schedule to cause the periodic rendezvous of the peer communication devices to commence upon termination of the periodic rendezvous of the foreign cluster of devices.

26. The network of claim 23, wherein to determine the priority between the anchor master and the anchor master of the foreign cluster of devices, the anchor master is further configured to compare the master preference value of the anchor master with a second master preference value of the anchor master of the foreign cluster of devices.

27. The network of claim 26, wherein the anchor master is further configured to identify the second master preference value in the heartbeat beacons.

28. The network of claim 23, wherein the discovery beacon transmitted by the sync master further comprises an identity of the anchor master with which the sync master is synchronized.

29. The network of claim 23, wherein the heartbeat beacon comprises an identity of the sync master with which the non-master peer device is synchronized.

30. The network of claim 23, wherein the one or more parameters of the foreign cluster of devices comprises at least one of a preference value of an anchor master of the foreign cluster, a size of the foreign cluster, a hop count from the anchor master of the foreign cluster to the device, or a discovery window schedule of the foreign cluster of devices.

* * * * *

UNITED STATES PATENT AND TRADEMARK OFFICE
CERTIFICATE OF CORRECTION

PATENT NO. : 10,003,642 B2
APPLICATION NO. : 14/293407
DATED : June 19, 2018
INVENTOR(S) : Vandwalle et al.

It is certified that error appears in the above-identified patent and that said Letters Patent is hereby corrected as shown below:

In the Claims

In Column 31, Line 24, please replace "a sum of number" with --a sum of a number--.

In Column 31, Line 27, please replace "a sum of number" with --a sum of a number--.

Signed and Sealed this
Fourth Day of December, 2018

Andrei Iancu
*Director of the United States Patent and Trademark Office*